(12) United States Patent
Vega et al.

(10) Patent No.: US 8,001,789 B2
(45) Date of Patent: Aug. 23, 2011

(54) UTILIZING INLET BLEED HEAT TO IMPROVE MIXING AND ENGINE TURNDOWN

(75) Inventors: Santiago Vega, Jupiter, FL (US); Charlie Ellis, Stuart, FL (US); Roger Kastelic, Palm City, FL (US); James Leahy, Hobe Sound, FL (US); Janak Raguraman, Stuart, FL (US)

(73) Assignee: Alstom Technologies Ltd., LLC, Baden (CH)

( * ) Notice: Subject to any disclaimer, the term of this patent is extended or adjusted under 35 U.S.C. 154(b) by 819 days.

(21) Appl. No.: 12/055,485

(22) Filed: Mar. 26, 2008

(65) Prior Publication Data
US 2009/0241552 A1    Oct. 1, 2009

(51) Int. Cl.
*F02C 7/04* (2006.01)

(52) U.S. Cl. ............... 60/785; 415/116; 60/772; 60/782; 60/773

(58) Field of Classification Search .................. 415/116, 415/58.5; 60/39.093, 726, 782, 785, 772
See application file for complete search history.

(56) References Cited

U.S. PATENT DOCUMENTS

| | | | | |
|---|---|---|---|---|
| 3,705,491 | A | * | 12/1972 | Foster-Pegg ................. 60/39.55 |
| 5,560,195 | A | | 10/1996 | Anderson et al. |
| 6,027,304 | A | | 2/2000 | Arar et al. |
| 6,685,425 | B2 | | 2/2004 | Poccia et al. |
| 7,841,186 | B2 | * | 11/2010 | So et al. ........................... 60/785 |
| 2005/0279101 | A1 | * | 12/2005 | Hoffmann et al. .............. 60/775 |
| 2009/0053036 | A1 | * | 2/2009 | Crawley et al. .............. 415/58.4 |

* cited by examiner

Primary Examiner — Ehud Gartenberg
Assistant Examiner — Steven Sutherland
(74) Attorney, Agent, or Firm — Shook, Hardy & Bacon L.L.P.

(57) ABSTRACT

An improved inlet bleed heat system for a gas turbine engine is disclosed. The inlet bleed heat system provides improved mixing in an inlet region while permitting the engine to be operated at lower power settings. The inlet bleed heat system comprises a supply conduit, a plurality of feed tubes extending from the supply conduit, and a guide tube for receiving opposing ends of the feed tubes. The plurality of feed tubes each have a plurality of injection orifices and the feed tubes are oriented such that the injection orifices generally face into a flow of oncoming air with the feed tubes being positioned forward of a plurality of sound attenuating baffles.

20 Claims, 6 Drawing Sheets

UTILIZING INLET BLEED HEAT TO IMPROVE MIXING AND ENGINE TURNDOWN

CROSS-REFERENCE TO RELATED APPLICATIONS

Not applicable.

TECHNICAL FIELD

The present invention relates to gas turbine engines. More particularly, embodiments of the present invention relate to a system and method for providing heated air to the inlet of a gas turbine engine for providing engine turndown and anti-icing capability.

BACKGROUND OF THE INVENTION

Gas turbine engines operate to produce mechanical work or thrust. Specifically, land-based gas turbine engines typically have a generator coupled thereto for the purposes of generating electricity. A gas turbine engine comprises an inlet that directs air to a compressor section, which has stages of rotating compressor blades. As the air passes through the compressor, the pressure of the air increases. The compressed air is then directed into one or more combustors where fuel is injected into the compressed air and the mixture is ignited. The hot combustion gases are then directed from the combustion section to a turbine section by a transition duct. The hot combustion gases cause the stages of the turbine to rotate, which in turn, causes the compressor to rotate.

The inlet of the gas turbine engine can also include heating devices and noise reduction devices. Specifically, heating devices can include injection devices capable of injecting heated air into the inlet. Noise reduction systems often times includes a plurality of baffles that reduce noise generated by a passing inlet air stream.

Figure 1:
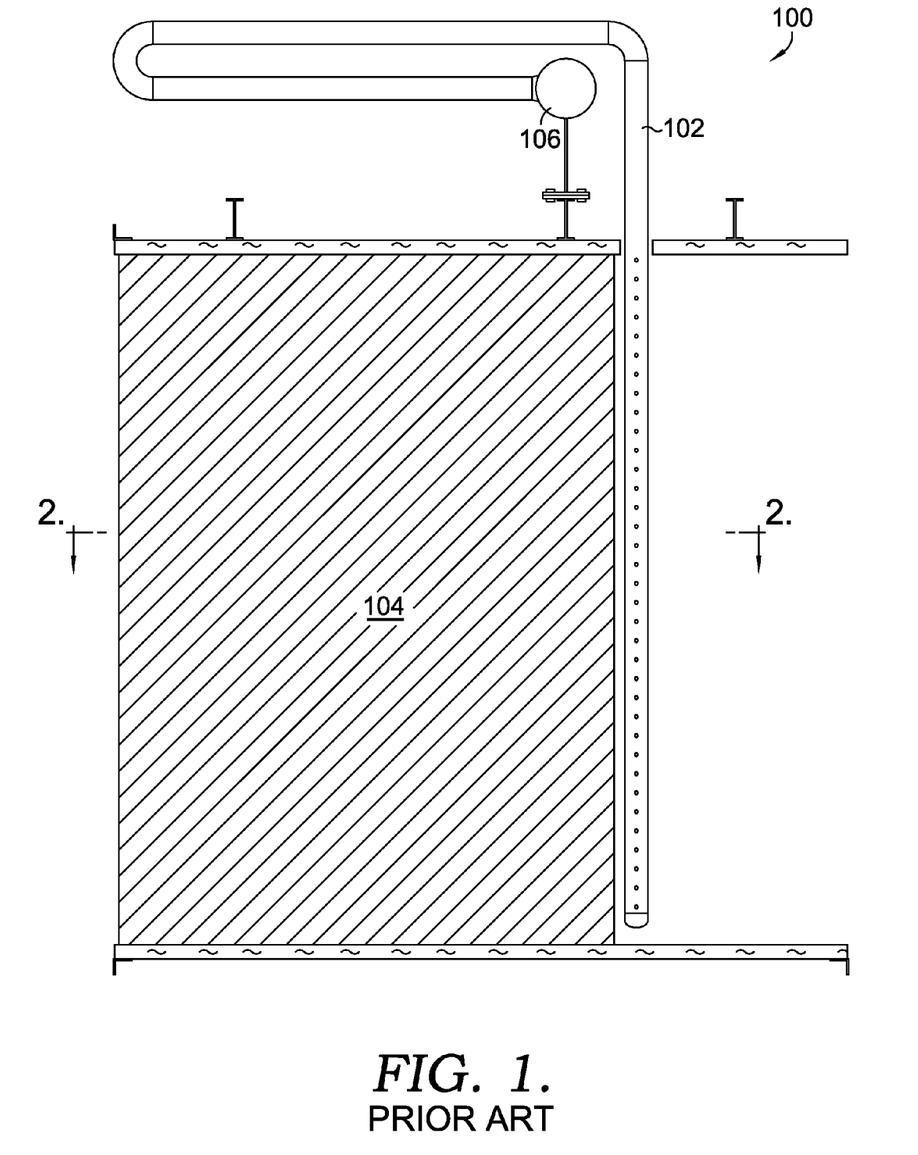
FIG. 1 depicts an elevation view of a portion of an inlet bleed heat system of the prior art.
Figure 2:
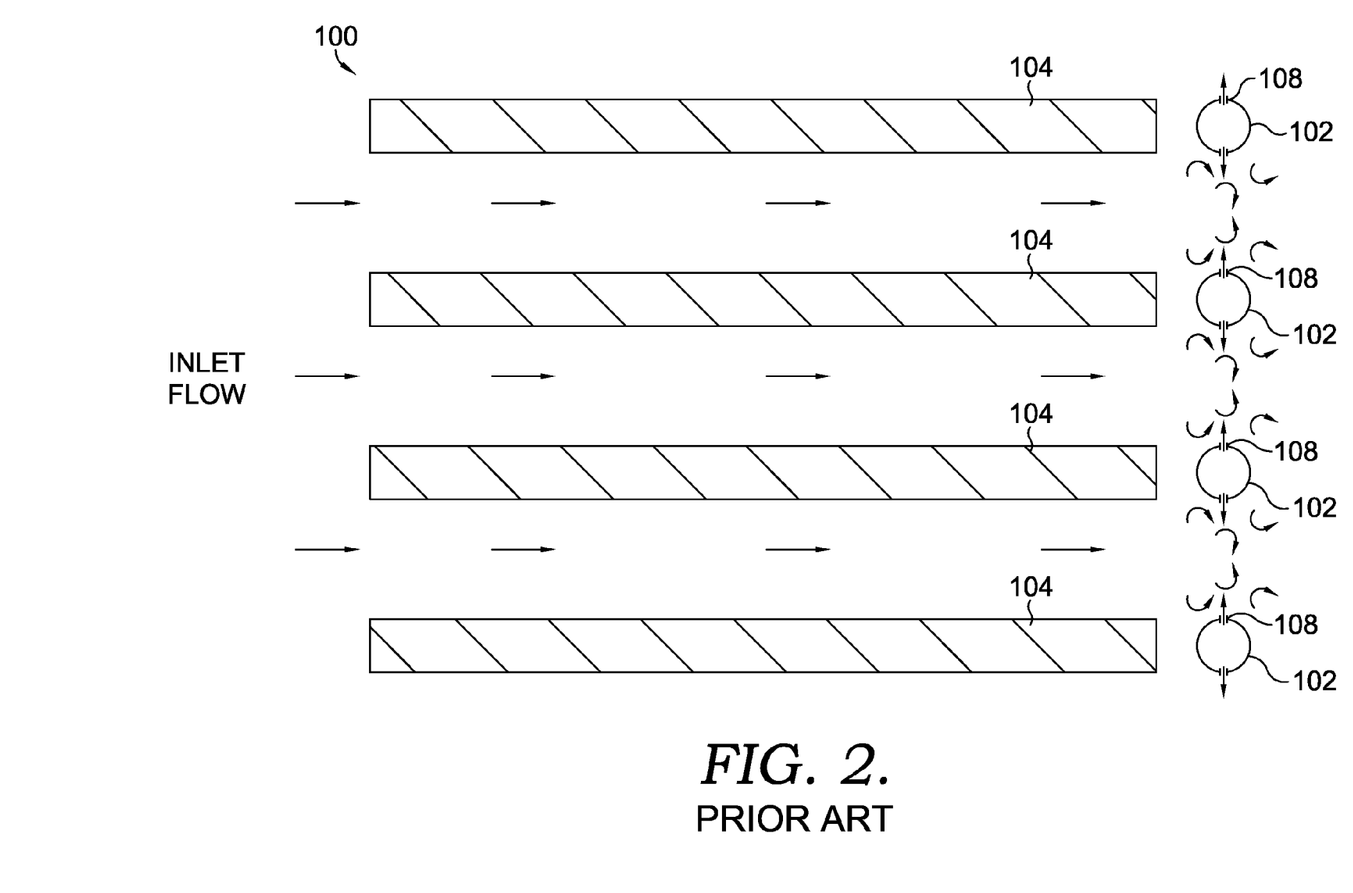
FIG. 2 depicts a cross section view of a portion of the inlet bleed heat system of FIG. 1.

Referring to FIGS. 1 and 2, a portion of an inlet bleed heat system 100 of the prior art is depicted. The inlet bleed heat system 100, which injects heated air into an inlet, comprises a plurality of feed tubes 102 that are positioned aft of and in-line with a silencer baffle 104. The plurality of feed tubes 102 receive a flow of heated air from a supply pipe 106 that is located above the baffles 104. As such, the plurality of feed tubes 102 hang in a generally vertical direction behind the baffles 104. Each of the feed tubes 102 contain a plurality of feed holes 108 that inject the flow of heated air from the feed tube 102 into a passing flow of inlet air. The plurality of feed holes 108 are oriented generally perpendicular to the passing flow of inlet air such that adjacent feed tubes 102 have feed holes 108 directed towards each other, as depicted in FIG. 2.

SUMMARY

Embodiments of the present invention are directed towards a system and method for, among other things, providing a supply of heated compressed air to an inlet of a gas turbine engine. An inlet bleed heat system in accordance with the present invention improves a range over which the gas turbine engine can be more effectively operated. Furthermore, the inlet bleed heat system, as disclosed, can provide a more uniform mixture of inlet air and heated compressed air in a shorter distance prior to entering a compressor section of the gas turbine engine.

In one embodiment of the present invention an inlet bleed heat system comprises a supply conduit, a plurality of feed tubes extending from the supply conduit, and a guide tube for receiving ends of the feed tubes opposite of the supply conduit. The feed tubes each have a plurality of injection orifices and the feed tubes are oriented such that the injection orifices generally face into a flow of oncoming air.

In another embodiment, a gas turbine engine is provided having a compressor, one or more combustion systems, a turbine, and one or more inlets. The one or more inlets comprise a housing, a plurality of baffles, a supply conduit, a plurality of feed tubes, and a guide tube. In this embodiment, the supply conduit extends generally longitudinally across the housing and has a plurality of openings to which the plurality of feed tubes are coupled. The plurality of feed tubes each have a plurality of injection orifices, and are also received in openings in the guide tube, which is oriented generally parallel to the supply conduit. In this embodiment, the supply conduit, plurality of feed tubes, and guide tube are positioned forward of the plurality of baffles within the inlet, with the plurality of injection orifices oriented in a direction opposite of the baffles.

In yet another embodiment, a method of providing increased turndown capability to a gas turbine engine is disclosed. Increasing the turndown capability of the engine allows the engine to be operated at a lower power setting than can typically be reached given minimum operating requirements and emissions permitting regulations. The method comprises directing a supply of compressed air from a compressed air source, such as an engine compressor, into a supply conduit, where a portion of the supply conduit is positioned within an inlet of the gas turbine engine. The supply of compressed air is distributed from the supply conduit to a plurality of feed tubes, where it is injected through a plurality of injection orifices into a flow of inlet air. The injection orifices are positioned generally normal to the flow of inlet air. The supply of compressed air initially travels in a direction generally opposite to the flow of inlet air and then turns and travels in a direction generally with the flow of inlet air. As such, the supply of compressed air travels around each of the feed tubes such that mixing with the flow of inlet air is promoted.

Additional advantages and features of the present invention will be set forth in part in a description which follows, and in part will become apparent to those skilled in the art upon examination of the following, or may be learned from practice of the invention.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 3:
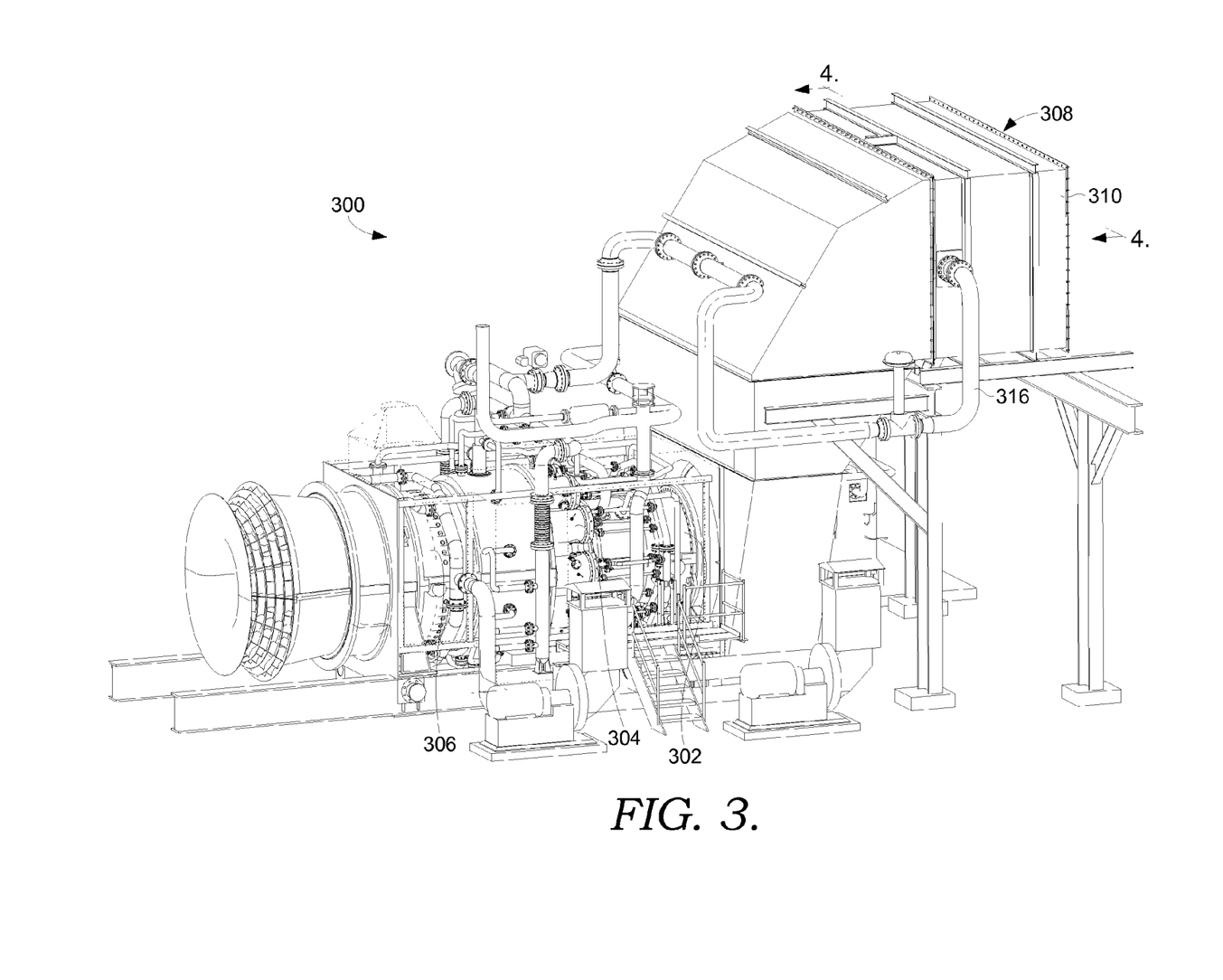
FIG. 3 depicts a perspective view of a gas turbine engine in accordance with an embodiment of the present invention.

Referring now to FIG. 3, a gas turbine engine 300 in accordance with an embodiment of the present invention is depicted. The gas turbine engine 300 comprises a compressor 302, which for the embodiment depicted is an axial type compressor. However, other compressor arrangements can be utilized in conjunction with this invention. The gas turbine engine 300 also comprises one or more combustion systems 304 that are in fluid communication with the compressor 302. For the embodiment depicted in FIG. 3, the gas turbine engine 300 utilizes a plurality of can-annular combustion systems. However, the invention is not limited to this combustor arrangement and can include a variety of combustor types (i.e. diffusion, premix, or a combination) that operate on a variety of fuel types (i.e. liquid, gaseous, or both).

Mechanically coupled to the compressor 302 and in fluid communication with the one or more combustion systems 304 is a turbine 306. The compressor 302 is coupled to the turbine 306 through a shaft that runs along a centerline of the engine. The turbine 306 receives the hot combustion gases from the one or more combustion systems 304 and the passing of the hot combustion gases across the blades of the turbine 306 turns the turbine 306, and thereby turns the compressor 302.

Air is the primary fluid used by the gas turbine engine 300 for compression, and that is mixed and reacted with a fuel source, so as to create the hot combustion gases used to drive the turbine. One or more inlets 308 are in fluid communication with the compressor 302 and are used to direct the air into the compressor 302. With reference now to FIGS. 4-8, the one or more inlets 308 comprise a housing 310 as well as other components of an inlet bleed heat system 312. Located within the housing 310 is a plurality of generally axially extending baffles 314. These baffles 314 are positioned within the housing 310 to reduce noise associated with a flow of inlet air passing through the housing 310.

Figure 4:
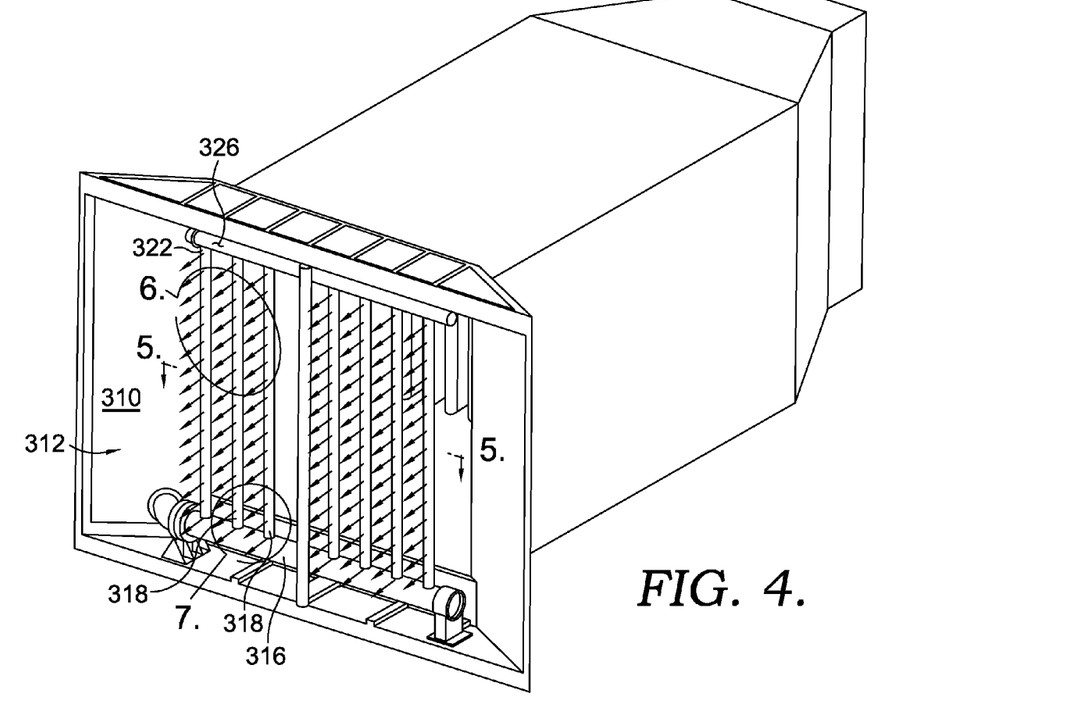
FIG. 4 depicts a perspective view of an inlet portion of a gas turbine engine in accordance with an embodiment of the present invention.

In this embodiment of the present invention, a supply conduit 316 extends through a wall of the housing 310 and generally longitudinally across a lower portion of the housing 310, as depicted in FIG. 4. In order to provide adequate sealing between the housing 310 and the supply conduit 316, a rope seal is positioned at the their interface to ensure that air directed into the inlet does not leak out of the inlet and into the surrounding atmosphere.

Figure 8:
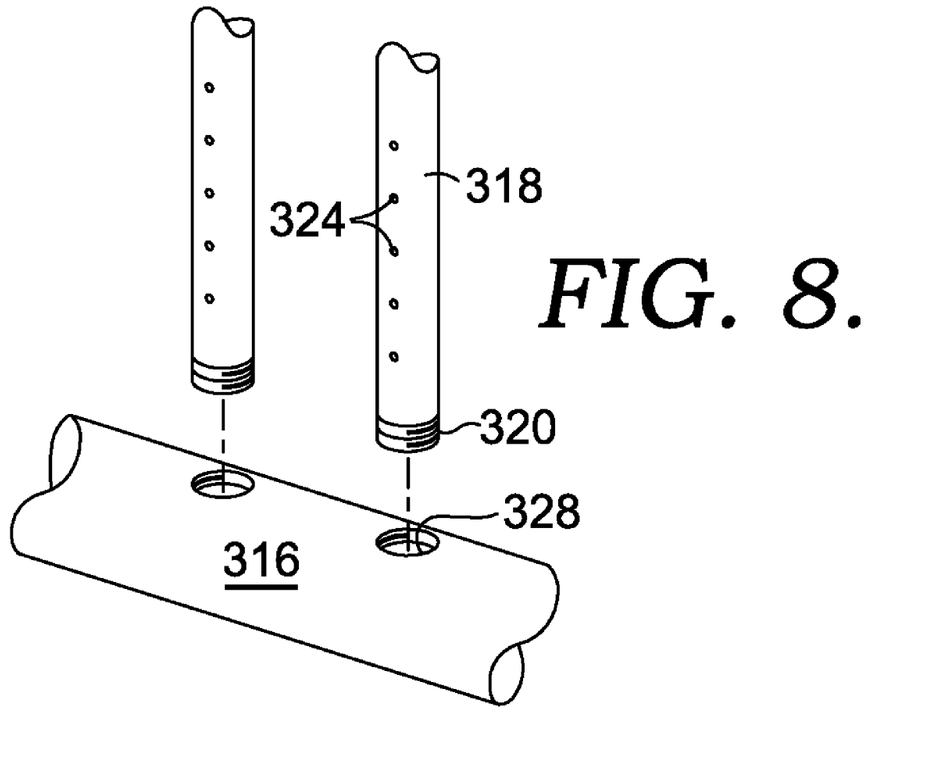

The supply conduit 316 is coupled to a plurality of feed tubes 318, which have a first end 320 and a second end 322, and a plurality of injection orifices 324. This coupling can occur in a variety of ways. One such way is through a threaded engagement between the supply conduit 316 and the first end 320 of the plurality of feed tubes 318. This coupling between the supply conduit 316 and the first end 320 of the plurality of feed tubes 318 is depicted in FIG. 8. The plurality of feed tubes 318 are coupled in a manner such that they extend in a generally perpendicular direction from the supply conduit 316. While a threaded engagement has been described, alternate coupling means between the supply conduit 316 and the plurality of feed tubes 318 are also envisioned, such as welding or removable fasteners.

The plurality of injection orifices 324 are drilled holes into the plurality of feed tubes 318. A variety of means can be used for placing the plurality of injection orifices 324 into the plurality of feed tubes 318. Some possible means include standard machine drilling, laser drilling, and electrical discharge machining (EDM). Due to the location and orientation of the plurality of feed tubes 318, complex injection nozzles in each of the plurality of injection orifices 324 are not required.

Positioned at the second end 322 of the plurality of feed tubes 318 is a guide tube 326. The guide tube 326 is oriented generally parallel to the supply conduit 316 and has a plurality of openings for receiving the second end 322 of the plurality of feed tubes 318. The openings in the guide tube 326 are larger than the diameter of the feed tubes 318 such that the feed tubes are retained within the guide tube 326 while not imparting a load onto the feed tubes 318. With the first end 320 of the plurality of feed tubes 318 coupled to the supply conduit 316, it is not desirable to couple the second end 322 to the guide tube 326. This allows for the plurality of feed tubes 318 to grow thermally towards the guide tube 326 to minimize any thermal stress in the plurality of feed tubes 318. Furthermore, since the second end 322 of the plurality of feed tubes 318 are not coupled to the guide tube 326 and can therefore rub or slide on the opening in the guide tube 326, it is possible that either one or both of these components can adversely wear. To limit the amount of wear exhibited by the plurality of feed tubes 318, an embodiment of the present invention has an area adjacent to the second end 322 of each feed tube 318, which contacts the opening in the guide tube 326, coated with a Tungsten Carbide (WC—Co) coating. This coating protects the plurality of feed tubes 318 and directs any wear to the guide tube 326, which is a simpler and less expensive component to repair and/or replace.

One such practical embodiment of the present invention utilizes a supply conduit 316 that extends across the housing 310 a length of nearly 12 feet and has eight feed tubes 318 that extend upward from the supply conduit 316. The supply conduit 316, plurality of feed tubes 318, and guide tube 326 are each fabricated from a stainless steel. These feed tubes 318 extend upwards a height of nearly 11 feet and contain over 100 equally spaced injection orifices 324. The quantity, size, and spacing of the plurality of injection orifices 324 is a function of a variety of factors such as pressure and temperature of the supply of compressed air and desired penetration of the supply of compressed air into the flow of inlet air. The plurality of feed tubes 318 are received within openings in the guide tube 326, which extends a length similar to that of the supply conduit 316.

As shown in FIG. 4, the supply conduit 316 extends in a generally horizontal direction, or longitudinally across the lower portion of the housing 310, and the plurality of feed tubes 318 extend generally perpendicular to the supply conduit 316, or in a generally vertical direction, which is parallel to the baffles 314. While this is one embodiment that is convenient from a piping arrangement and for securing the supply conduit 316 to the housing 310, it is not the only possible arrangement. An alternate configuration of the components of the inlet bleed heat system 312, namely the supply conduit 316, plurality of feed tubes 318, and guide tube 326 would be to orient the inlet bleed heat system 90 degrees to that depicted in FIG. 4, such that the supply conduit 316 would be oriented in a generally vertical direction. In this alternate configuration, the plurality of feed tubes 318 would then extend in a generally horizontal direction to a generally vertically extending guide tube 326. This type of arrangement for the components of the inlet bleed heat system 312 may be necessary depending on the orientation of the baffles 314 and the manner in which a supply conduit 316 can be directed into the housing 310. It is also possible that the configuration depicted in FIG. 4 could be inverted 180 degrees such that the supply conduit 316 extends across an upper portion of the housing 310 and the plurality of feed tubes 318 extend downward to a guide tube 326 that extends along a lower portion of the housing 310. Alternatively, the inlet bleed heat system 312 could be oriented at some angle in between.

Figure 5:
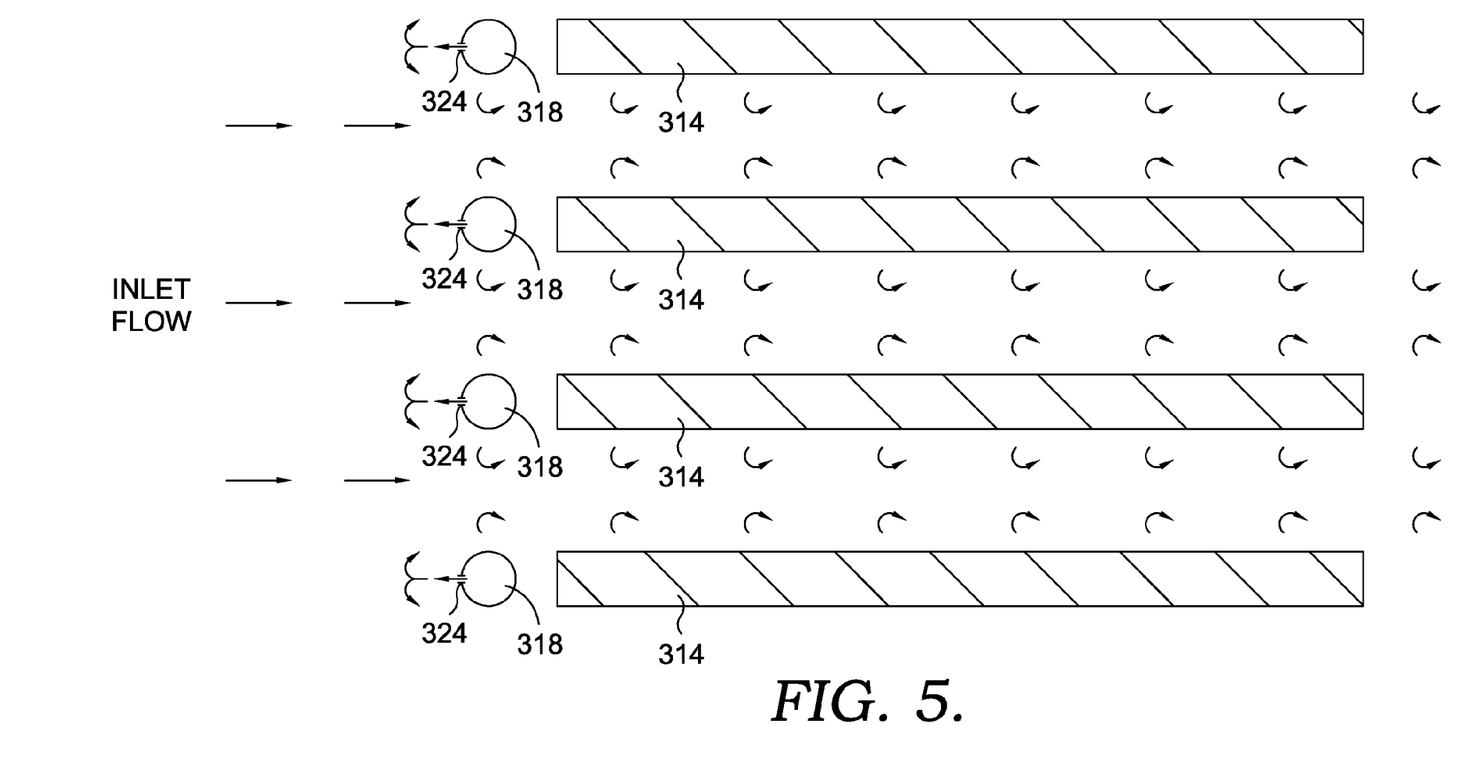
FIG. 5 depicts a cross section view of a portion of the inlet depicted in FIG. 4 in accordance with an embodiment of the present invention.
Figure 6:
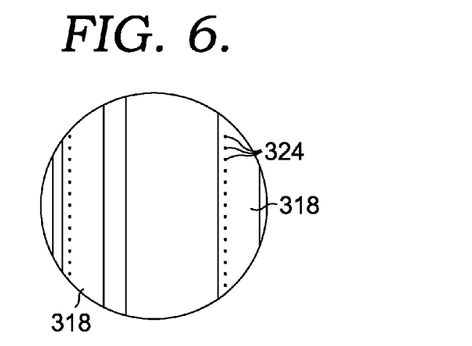
FIG. 6 depicts a detailed elevation view of a portion of the feed tubes of the inlet depicted in FIG. 4 in accordance with an embodiment of the present invention.
Figure 7:
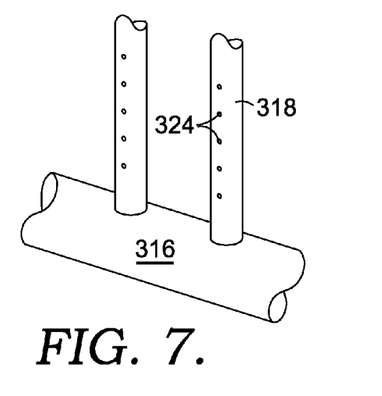
FIG. 7 depicts a detailed perspective view of a portion of the feed tubes and supply conduit depicted in FIG. 4 in accordance with an embodiment of the present invention; and, FIG. 8 depicts a partial exploded view of a portion of the supply conduit and a feed tube of FIG. 7 in accordance with an embodiment of the present invention.

Referring to FIGS. 4 and 5, the supply conduit 316, plurality of feed tubes 318, and guide tube 326 are positioned forward of the plurality of generally axially extending baffles 314. As it can be seen in FIG. 5, in addition to the axial position of the feed tubes 318 relative to the baffles 314, the plurality of feed tubes 318 are also positioned such that the plurality of injection orifices 324 are oriented in a direction generally opposite to the baffles 314. Although depicted forward of the generally axially extending baffles 314, the supply conduit 316, plurality of feed tubes 318, and guide tube 326 can be positioned aft of the baffles 314 as long as the plurality of injection orifices 324 are oriented into the flow of inlet air.

In an alternate embodiment of the present invention, an inlet bleed heat system 312 is provided. This inlet bleed heat system 312 is typically used in conjunction with the gas turbine engine 300 previously discussed, however can be fabricated and installed separately from the gas turbine engine 300. The inlet bleed heat system 312 comprises a supply conduit 316 oriented in a generally horizontal direction, a plurality of feed tubes 318, and a guide tube 326. More specifically, the plurality of feed tubes 318 have a first end 320, a second end 322, and a plurality of injection orifices 324. The plurality of feed tubes 318 are positioned such that the plurality of injection orifices 324 are oriented generally into a flow of oncoming air (see FIG. 5). The first end 320 of the feed tubes 318 are coupled to the supply conduit 316 and the feed tubes extend in a direction that is generally perpendicular from the supply conduit 316. A manner by which the plurality of feed tubes 318 are coupled to the supply conduit 316 is through a threaded coupling in that the first end 320 of the feed tubes 318 is threaded so as to engage a corresponding threaded portion 328 of the supply conduit 316 (see FIG. 8).

The guide tube 326 is spaced a distance apart from the supply conduit 316 and is oriented generally parallel with the supply conduit 316. The guide tube 326 further comprises a plurality of openings for receiving the second end 322 of the plurality of feed tubes 318. These openings have a diameter that is larger than that of the plurality of feed tubes 318 so as to provide space to compensate for any thermal growth of the plurality of feed tubes 318. The inlet bleed heat system 312 is coupled to a source of compressed air, which may or may not be associated with the gas turbine 300. Examples of the source of compressed air can include an auxiliary compressor or storage tank.

In yet another embodiment of the present invention, a method of providing increased turndown to a gas turbine engine is disclosed. Turndown, as one skilled in the art will understand, allows an operator of a gas turbine engine to run the engine at lower load settings while maintaining emissions compliance. Often times complex fuel scheduling is required to lower the load settings without violating emissions regulations. However, an alternate manner in which engine turndown can be achieved is through adding pre-heated air to the compressor of the engine. By raising the air temperature to the compressor, the air density is reduced, thereby reducing the mass flow through the engine, and hence the power output of the gas turbine.

The method comprises directing a supply of compressed air from a compressed air source into a supply conduit. One form of a compressed air source is a plenum of compressed air positioned adjacent the discharge of the engine compressor. However, compressed air can be taken directly from a stage of the compressor if lower pressure air is desired. For an embodiment of the present invention, compressed air taken from the compressor discharge has a pressure of approximately 110 pounds per square inch (psi) and a temperature of approximately 550 degrees Fahrenheit (deg. F.). The compressed air is directed into a supply conduit 316, of which a portion of the supply conduit 316 is positioned within a housing 310 of the gas turbine engine 300, as depicted in FIG. 4. However, the supply conduit 316 also includes portions that extend between the compressed air source and the inlet 308 of the gas turbine engine as depicted in FIG. 3.

The supply of compressed air is then distributed from the supply conduit 316 to a plurality of feed tubes 318. As depicted in FIG. 4, the plurality of feed tubes 318 extend from the supply conduit across the housing 310. The supply of compressed air is then injected into a flow of inlet air by a plurality of injection orifices 324 in each of the plurality of feed tubes 318. As it can be seen by FIG. 5, the plurality of injection orifices 324 are positioned generally normal to the flow of inlet air. In operation, the supply of compressed air is injected by the plurality of feed tubes 318 and travels in a direction generally opposite to that of the flow of inlet air. The supply of compressed air then turns and travels in a direction generally with the flow of inlet air. As a result, the supply of compressed air then travels around each of the plurality of feed tubes 318 which propagates mixing. This change in flow direction is depicted by the arrows in FIG. 5. The direction of compressed air injection allows the compressed air to penetrate upstream, thereby maximizing the effective mixing length with the flow of inlet air prior to the mixture entering the compressor 302 of the gas turbine engine 300. As an example, the length required to mix the supply of compressed air with the flow of inlet air is reduced to approximately 14 inches, which is a significantly shorter mixing distance than the prior art.

The use of an inlet bleed heat system 312 is primarily used for either achieving low power operations (turndown) while maintaining emissions compliance or for anti-icing functions. If ice forms in the housing 310 of the inlet 308 and breaks loose during engine operation, severe damage can occur to the compressor 302. Therefore, by injecting a supply of compressed air into the housing 310 having an elevated temperature compared to the flow of inlet air, the overall operating temperature of the inlet 308 is increased, thereby preventing ice formation.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. An inlet bleed heat system comprising:
an air supply conduit;
a plurality of feed tubes having a first end, a second end, and a plurality of injection orifices, with the first end of the feed tubes coupled to the air supply conduit, and the feed tubes extending in a direction generally perpendicular from the air supply conduit; and,
a guide tube spaced a distance apart from and oriented generally parallel with the air supply conduit, the guide tube having a plurality of openings receiving the second end of the plurality of feed tubes;
wherein the plurality of feed tubes are located between the air supply conduit and the guide tube having the plurality of injection orifices oriented generally parallel and opposite a flow of oncoming air.

2. The system of claim 1, wherein the air supply conduit further comprises a plurality of threaded openings receiving the first end of the plurality of feed tubes.

3. The system of claim 2, wherein the first end of the plurality of feed tubes are threaded so as to correspond to the plurality of threaded openings in the air supply conduit.

4. The system of claim 1, wherein the air supply conduit is oriented generally horizontally.

5. The system of claim 1, wherein the plurality of feed tubes pass through the plurality of openings in the guide tube.

6. The system of claim 5, wherein the plurality of openings in the guide tube have a diameter that is larger than a diameter of the plurality of feed tubes to provide for thermal expansion of the feed tubes.

7. A method of providing increased turndown capability to a gas turbine engine, the method comprising:
directing an air supply of compressed air from a compressed air source into a supply conduit where a portion of the supply conduit is positioned within an inlet of the gas turbine engine;
distributing the air supply of compressed air from the supply conduit to a plurality of feed tubes; and,
injecting the supply of compressed air from each of the feed tubes, through a plurality of injection orifices, into a flow of inlet air, an open area of the injection orifices positioned generally normal to the flow of inlet air such that the supply of compressed air, upon injection, initially travels in a direction generally opposite to the flow of inlet air, then turns and travels in a direction generally with the flow of inlet air, such that the supply of compressed air travels around each of the feed tubes.

8. The method of claim 7, wherein the supply of compressed air is extracted from an area adjacent to a discharge of a compressor.

9. The method of claim 8, wherein the supply of compressed air has a temperature higher than that of the inlet air.

10. The method of claim 7, further comprising mixing the supply of compressed air with the flow of inlet air.

11. A gas turbine engine comprising:
a compressor;
one or more combustion systems in fluid communication with the compressor;
a turbine coupled to the compressor and in fluid communication with the one or more combustion systems; and,
one or more housing inlets in fluid communication with the compressor, the one or more housing inlets comprising:
a housing defining an inlet;
a plurality of generally axially extending baffles perpendicular to said inlet;
an air supply conduit extending generally longitudinally across the housing approximately in the plane of said inlet;
a plurality of feed tubes having a first end, a second end, and a plurality of injection orifices, with the first end of the feed tubes coupled to the air supply conduit and extending in a generally perpendicular direction from the air supply conduit; and,
a guide tube oriented generally parallel to the air supply conduit, the guide tube having a plurality of openings for receiving the second end of the plurality of feed tubes;
wherein the air supply conduit, the plurality of feed tubes, and the guide tube are positioned adjacent to the plurality of generally axially extending baffles, and the plurality of injection orifices are oriented in a direction generally parallel and opposite a flow of air passing through the one or more housing inlets.

12. The gas turbine engine of claim 11, wherein the air supply conduit, the plurality of feed tubes, and the guide tube are located forward of the plurality of generally axially extending baffles.

13. The gas turbine engine of claim 11, wherein the air supply conduit extends through a wall of the housing.

14. The gas turbine engine of claim 13, wherein the air supply conduit is oriented in a generally vertical direction.

15. The gas turbine engine of claim 14, wherein the plurality of feed tubes are oriented in a generally horizontal direction.

16. The gas turbine engine of claim 13, wherein the air supply conduit further comprises a rope seal that provides a sealing joint between the air supply conduit and the housing.

17. The gas turbine engine of claim 11, wherein the air supply conduit further comprises a plurality of threaded openings receiving the plurality of feed tubes.

18. The gas turbine engine of claim 17, wherein the first end of the plurality of feed tubes has a thread corresponding to the plurality of threaded openings in the air supply conduit.

19. The gas turbine engine of claim 11, wherein the plurality of openings in the guide tube have a diameter that is larger than a diameter of the feed tubes to provide for thermal expansion capability for the feed tubes.

20. The gas turbine engine of claim 11, wherein the plurality of feed tubes extend in a direction generally parallel with the plurality of generally axially extending baffles.

* * * * *